(12) United States Patent
Sheth

(10) Patent No.: US 11,212,492 B1
(45) Date of Patent: Dec. 28, 2021

(54) LINKED TRANSACTION CAMERA WITH CACHED VIDEO LOG

(71) Applicant: NCR Corporation, Atlanta, GA (US)

(72) Inventor: Kalpesh Sheth, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/911,029

(22) Filed: Jun. 24, 2020

(51) Int. Cl.
| | |
|---|---|
| *H04N 7/18* | (2006.01) |
| *G06Q 20/18* | (2012.01) |
| *G06Q 30/00* | (2012.01) |
| *G06F 16/78* | (2019.01) |
| *G08B 13/196* | (2006.01) |
| *G06F 16/71* | (2019.01) |
| *H04N 5/77* | (2006.01) |
| *G08B 3/10* | (2006.01) |
| *G08B 5/36* | (2006.01) |

(52) U.S. Cl.
CPC ............ *H04N 7/188* (2013.01); *G06F 16/71* (2019.01); *G06F 16/7867* (2019.01); *G06Q 20/18* (2013.01); *G06Q 30/0185* (2013.01); *G08B 13/19669* (2013.01); *G08B 3/10* (2013.01); *G08B 5/36* (2013.01)

(58) Field of Classification Search
CPC .... H04N 7/188; G06Q 20/18; G06Q 30/0185; G06F 16/7867; G06F 16/71; G08B 13/19669; G08B 3/10; G08B 5/36

USPC ....... 348/143, 144, 148, 149, 150, 151, 152; 386/223, 224, 226, 228, 248
See application file for complete search history.

(56) References Cited

U.S. PATENT DOCUMENTS

| | | | |
|---|---|---|---|
| 2007/0017974 A1* | 1/2007 | Joao | G06Q 20/32 235/380 |
| 2009/0225163 A1* | 9/2009 | Chathukutty | G08B 13/19645 348/143 |

* cited by examiner

*Primary Examiner* — Robert Chevalier
(74) *Attorney, Agent, or Firm* — NCR Corporation

(57) ABSTRACT

A management terminal manages a plurality of Self-Service Terminals (SSTs) for customer-assistance, transaction overrides, theft determinations, and transaction security audits. One or more overhead cameras stream real-time video of the transactions being processed at the SSTs to a server. Transaction data produced in real time at the SSTs are also provided to the server. The video is correlated with the transaction data and evaluated for security events. The video is also cached on the server. An operator of the management terminal can access a video review interface based on events and/or information visually gleaned by the operator during the transactions. The interface permits the operator to view a configured cached portion of the video captured for any given transaction to provide context to the operator for determining whether to perform or whether not to perform a transaction audit.

17 Claims, 3 Drawing Sheets

US 11,212,492 B1

LINKED TRANSACTION CAMERA WITH CACHED VIDEO LOG

BACKGROUND

Self-checkouts at retail stores have become commonplace in the industry. A staff-operated terminal typically monitors the self-checkout terminals for purposes of assisting customers that are having problems completing their transactions and identifying customer thefts. During busy customer traffic, the staff can be overwhelmed with needed or perceived transaction interventions.

Many times, the staff has to make split second decisions as to whether to audit customers for potential theft at the self-checkout terminals. The staff-operated terminal may provide detected information that could be useful to the staff but often that information requires more inspection by the staff to decide whether a customer transaction should be audited. By the time the information is investigated, the customer may have already checked out and left the store.

Staff may have well-founded suspicions that a customer is engaged in theft and yet no security event is raised for the transaction at the staff-operated terminal. In these situations, the staff does not want to perform an audit of the customer based on a suspicion because audits can create customer animosity and there were not any security-related events, which were raised at the staff-operated terminal.

So, in most cases the staff elects not to perform transaction audits because the staff is overwhelmed assisting in transaction overrides at the self-checkout terminals, busy answering customer questions, and/or busy evaluating raised security events. Consequently, the staff is more likely to simply clear any security events than engage customers in transaction audits.

Theft from fake scanning bar coded items and theft from swapping less expensive bar codes onto more expensive items remain problematic for the industry. The staff is simply stretched too thin to effectively determine whether to perform transaction audits and any raised security events are often not accurate enough to rely on.

SUMMARY

In various embodiments, methods and a system for self-checkout security video review are presented.

According to an embodiment, a method for processing self-checkout security video review is provided. A video streamed from a camera and captured by the camera for a transaction area of a transaction terminal is cached within a cache. Transaction data associated with a transaction occurring at the transaction terminal is obtained and the transaction data is linked to portions of the video residing in the cache. A request for a video clip of the transaction is received. The video clip and the transaction data are provided to a management terminal based on the request by taking a configured amount of the video from the cache that starts at a first configured time before an event and continues through a second configured time after the event.

DETAILED DESCRIPTION

Figure 1:
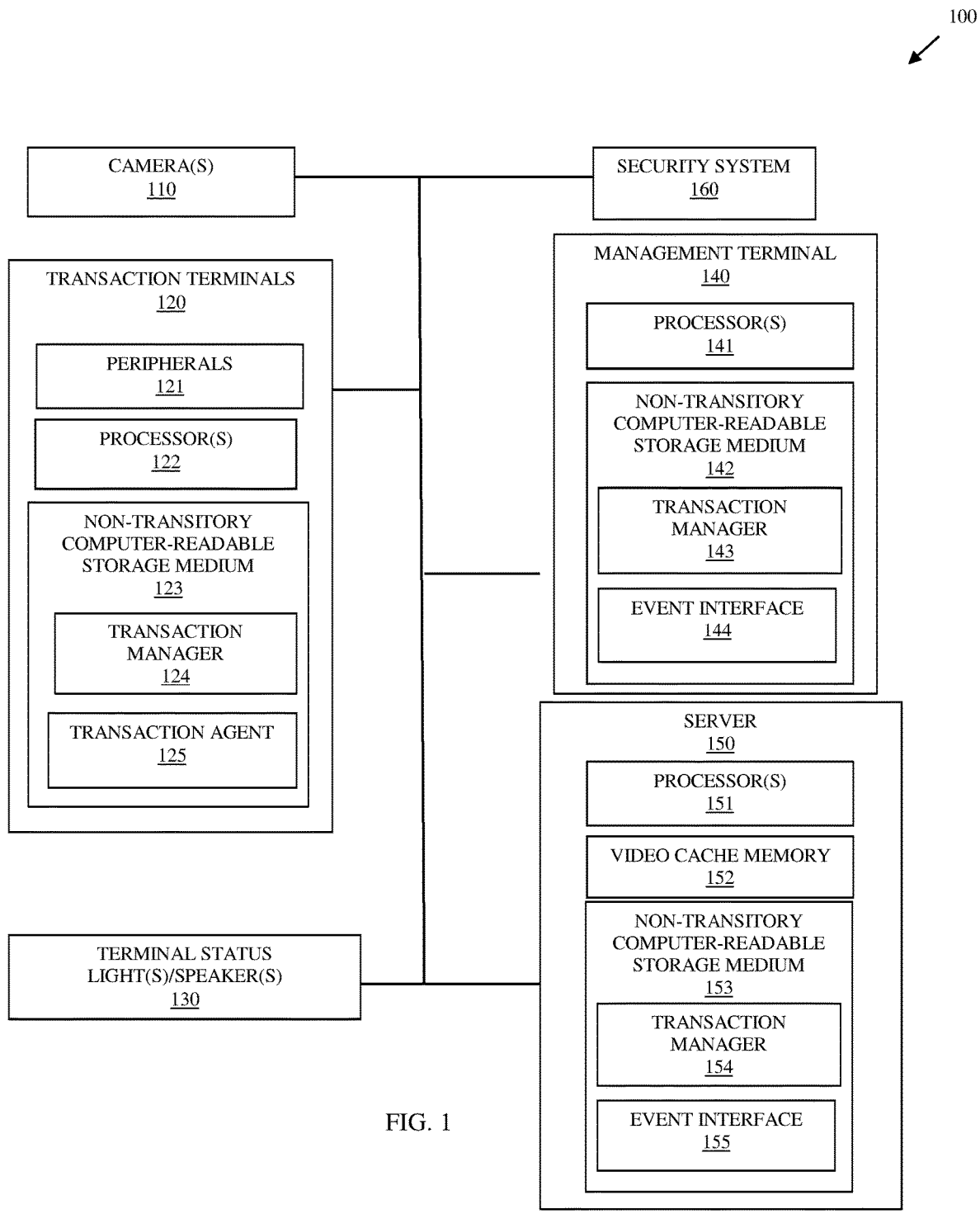
FIG. 1 is a diagram of a system for processing self-checkout security video review, according to an example embodiment.

FIG. 1 is a diagram of a system 100 for processing self-checkout security video review, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of processing self-checkout security video review, presented herein and below.

The system 100 permits an operator of a management terminal to access an interface and review a cached portion of a transaction at any of the managed transaction terminals. Overhead cameras proximate to the transaction terminals stream real-time video of the transaction areas to a server. The server caches the video and the operator can access an interface from the management terminal to review a preconfigured amount of video from the video cache for any given transaction for purposes of determining whether to perform or whether not to perform a transaction audit.

The system 100 includes cameras 110, transaction terminals 120, terminal status lights/speakers 130, a management terminal 140, a server 150, and a security system 160.

Each transaction terminal 120 comprises a plurality of peripheral devices 121 (card reader, printer, media handling device, touch display screen, keypad, etc.), one or more processors 122, and a non-transitory computer-readable storage medium 123 comprising executable instructions representing a transaction manager 124 and a transaction agent 125.

Management terminal 140 comprises one or more processors 141 and a non-transitory computer-readable storage medium 142 comprising executable instructions representing a transaction manager 143 and an event interface 144.

Server 150 comprises one or more processors 151, a video cache memory 152, and a non-transitory computer-readable storage medium 153 comprising executable instructions representing a transaction manager 154 and an event interface 155.

Security system 160 correlates transaction video captured by cameras 110 with transaction data generated by transaction managers 124 of transaction terminals 120. Security system 150 also generates security events based on the correlations and security rules. Still further, security system 150 correlates the security events with corresponding portions of the captured video.

Terminal status lights/speakers 130 are activated by security events raised from security system 160, states of transaction terminals 120, transaction manager 143 of management terminal 140, and transaction manager 154 of server 150. Activation includes illumination of one or more colored lights 130 and/or playing a security tone or audio over speakers 130.

During operation of system 100, customers perform self-checkouts on terminals 120 while cameras 110 capture video of each transaction area for each terminal. The video is streamed from cameras 110 to server 150. Concurrently, transaction data being generated at the terminals 120 are sent to transaction manager 143 of management terminal 140 and, optionally, transaction data can be displayed on a display associated with management terminal 140 by the operator of terminal 140. Additionally, the transaction data may also be sent to transaction manager 155 of server 150.

Video data streamed from cameras 110 may be permanently stored on server 150 and indexed and linked with the corresponding transaction data and security events. Moreover, the video data for each transaction at each terminal 120 is cached in cache memory 153 (cache 153). Event interface 144 may be used to set the time duration for which each video captured for each transaction is maintained in cache 153. That is, operator of terminal 140 accesses event interface 144 to interact with event interface 156 of server 150. The time duration is configured by the operator. The time duration begins at a period of time that precedes any given start of a transaction precedes a time stamp associated with a given security event raised by security system 160. The same time period of time or a different operator configured period of time that identifies a length of time after a transaction ends and/or after the time stamp of the security event. Event interface 156 constructs a video clip from the video in cache 153 that starts at the configured period of time before transaction start or event time stamp and continues past transaction end or event time stamp for the same configured period of time or for a different operator-defined second period of time.

Event interface 156 caches the video and indexes time stamps within the video to a given terminal identifier for a given terminal 120 and a given transaction identifier for a given transaction. Event interface 156 stores the video captured by cameras 110 in cache along with metadata associated with the corresponding terminal identifiers and transaction identifiers. The length of time before and after the transaction/event timestamp is defined by the configurable period of times referenced above and set by the operator of management terminal 140 through event interface 144. Event interface 156 uses the configurable period or times to derive or construct a video clip from the video within the cache 153.

Management terminal 140 also receives transaction data and any raised security events from security system 160. An operator may elect to review the video of any given transaction area for any given terminal 120 and corresponding transaction by requesting a corresponding video clip using event interface 144. Upon receiving a video review request, event interface 156 accesses cache 153 using the transaction identifier for the transaction requested, constructs the corresponding video clip (based on the configured before and after time periods), and streams the video clip or provides a link to the video clip back to event interface 144 where the operator can review the video in real time on a display of terminal 140. A security event may cause transaction manager 155 to alert event interface 156 and automatically stream the corresponding transaction's video clip (using the configured period of time/times before and after the event timestamp) to event interface 144 or automatically display a popup window within event interface 144 with a link for displaying the video clip once the link is activated by the operator.

Within event interface 144, the transaction data (such as items scanned for the transaction and item prices) may be presented along side of the video clip being played for the transaction area. In this way, the operator can view the recorded items scanned/entered for the transaction while simultaneously viewing the video clip for the transaction area. This provides the operator with the necessary context for the transaction while the video clip is being played. The operator may also pause, fast forward, and rewind the video being played within event interface 144.

In an embodiment, as each transaction item is scanned it is associated with a time stamp that corresponds to a time stamp in the video captured for any given transaction. The operator when reviewing a transaction video clip may click on a given displayed transaction item and event interface 144 automatically skips ahead or rewinds from a current point in the video being played to the time stamp within the video clip that corresponds to the selected item, which was selected by the operator within event interface 144.

Security system 160 may perform its own real-time analysis of the transaction items within the video stream for purposes of raising security alerts sent to transaction manager 143. Transaction manager 143 then uses an Application Programming Interface (API) to event interfaces 156 and 144 for purposes of having predefined security events automatically retrieve the corresponding video clip associated with the transaction from cache 153 and automatically initiating the video clip or automatically providing a link to the video clip within event interface 144 for operator review.

Again, the operator is in control of when or if a video clip associated with a given transaction of a given transaction terminal 120 is played within event interface 144. Moreover, the period of time for which the video clip is captured both before and after the transaction/event timestamp can be configured by the operator within event interface 144 (interface 144 interacts with event interface 156). Further, if security system 160 is configured to display a shorter or a larger amount of the transaction video associated with a security event, this is overridden by event interface 156 and a shorter or a longer length of time associated with the configured period of time before and after the security event or the transaction as a whole is provided in the delivered video clip from cache 153.

In an embodiment, any generated security events for a transaction are also time stamped within the corresponding video clip and the security events are presented along with the transaction items within the video clip retrieved from cache 153. A selection of a given security event will automatically cause the video clip being played within event interface 144 to skip forward or backward and play the video clip at the time stamp associated with the security event.

It is noted that not all security events require a review by the operator of management terminal 140; however, such types of security events may still be displayed with the video clip selected for play by the operator within event interface 144. So, when the operator decides in real time to review a transaction that is occurring at a terminal 120, the then-existing and already scanned items are listed along with any raised security events. Both the transaction items and the security events are linked within the video clip for quick review by the operator. Furthermore, because the video clip includes video before and after each event was raised and before and after each item was scanned, the operator is provided a full visual context of any given security event and/or item scanned from the video clip retrieved from cache 153.

System 100 permits the operators of management terminals 140 to define a context before and after a transaction or security event for which a video clip is derived from video in cache 153. Because cache 153 is in memory, retrieval and play of the video clip is fast and efficient. As a result, operators get a real time or near real time visual review of transactions with a full context. Moreover, the video clip is time indexed and linked to both transaction data (item scans, payment information, etc.) and the security events raised by security system 160. So, the operator can quickly view specific portions of the transaction for theft when needed.

System 100 also substantially reduces the workload of the operator so that determinations as to whether to stop a customer before the customer exits a store and an operator audit of the transaction may occur.

In an embodiment, event interface 144 may also include an option for the operator to raise an alert to transaction manager 143 when an audit is need or when a theft is suspected. By activating the option within event interface 144 while the operator is visually inspecting the corresponding video clip, transaction manager 143 can cause terminal status lights 130 to illuminate in a predefined color or with a predefined effect and/or cause speakers 130 to play an audible voice instruction and/or distinguishable audible sound/beep.

In an embodiment, terminals 120 include SSTs, AMTs, self-grocery store checkouts, and/or kiosks.

In an embodiment, management terminal 140 can include a specially configured SST, Point-Of-Sale (POS) terminal, teller terminal, a tablet computer, a laptop computer, a desktop computer, and/or a mobile phone.

In an embodiment, server 150 is a cloud processing environment (cloud) comprising multiple servers logically organized as a single environment.

These and other embodiments are now discussed with reference to the FIGS. 2-3.

Figure 2:
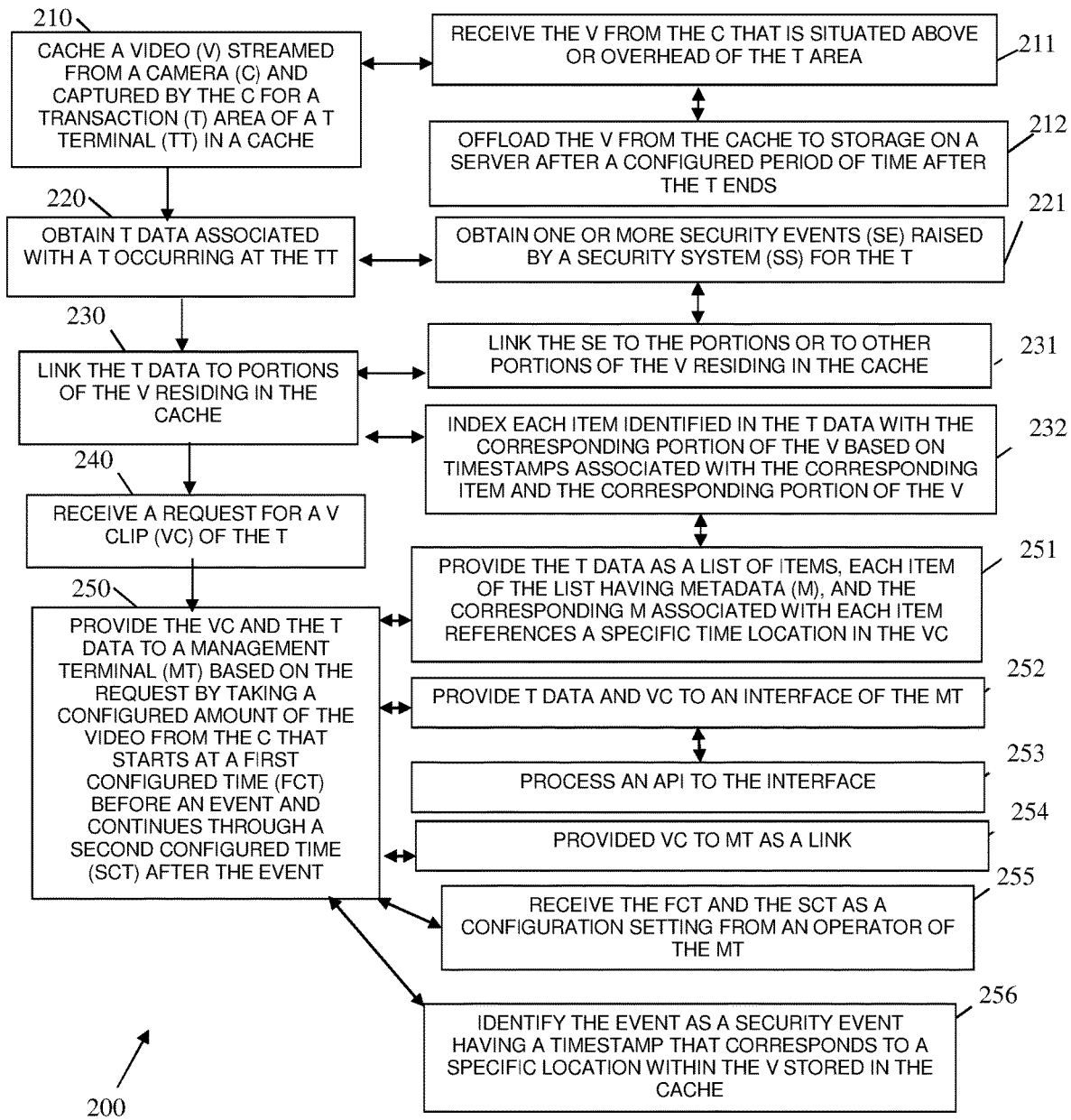
FIG. 2 is a diagram of a method for processing self-checkout security video review, according to an example embodiment.

FIG. 2 is a diagram of a method 200 for processing self-checkout security video review, according to an example embodiment. The software module(s) that implements the method 200 is referred to as a "transaction video clip cache manager." The transaction video clip cache manager is implemented as executable instructions programmed and residing within memory and/or a non-transitory computer-readable (processor-readable) storage medium and executed by one or more processors of a cloud/server. The processor(s) of the cloud/server that executes the transaction video clip cache manager are specifically configured and programmed to process the transaction video clip cache manager. The transaction video clip cache manager has access to one or more network connections during its processing. The network connections can be wired, wireless, or a combination of wired and wireless.

In an embodiment, the transaction video clip cache manager executes on server 150. In an embodiment, server 150 is part of a cloud processing environment.

In an embodiment, the transaction video clip cache manager is all or some combination of transaction manager 155, event interface 156, and/or security system 160.

At 210, the transaction video clip cache manager caches a video streamed from a camera and captured by the camera for a transaction area of a transaction terminal in a cache.

In an embodiment, at 211, the transaction video clip cache manager receives the video from the camera that is situated above or overhead of the transaction area.

In an embodiment of 211 and at 212, the transaction video clip cache manager offloads the video from the cache to storage on a server after a configured period of time after the transaction ends.

At 220, the transaction video clip cache manager obtains transaction data associated with a transaction occurring at the transaction terminal.

In an embodiment, at 221, the transaction video clip cache manager obtains one or more security events raised by a security system for the transaction.

At 230, the transaction video clip cache manager links the transaction data to portions of the video residing in the cache.

In an embodiment of 221 and 230, at 231, the transaction video clip cache manager links the one or more security events to the portions or to other portions of the video residing in the cache.

In an embodiment, at 232, the transaction video clip cache manager indexes each item identified in the transaction data with the corresponding portion of the video based on timestamps associated with the corresponding item and the corresponding portion of the video.

In an embodiment of 232 and at 233, the transaction video clip cache manager provides the transaction data as a list of the items, each item of the list having metadata, and the corresponding metadata associated with each item references a specific time location within the video clip.

At 240, the transaction video clip cache manager receives a request for a video clip of the transaction.

At 250, the transaction video clip cache manager provides the video clip and the transaction data to a management terminal based on the request by taking a configured amount of the video from the cache that starts at a first configured time before an event and continues through a second configured time after the event.

In an embodiment of 232 and 250, at 251, the transaction video clip cache manager provides the transaction data as a list of the items, each item of the list having metadata, and wherein the corresponding metadata associated with each item references a specific time location within the video clip.

In an embodiment, at 252, the transaction video clip cache manager provides the transaction data and the video clip to an interface of the management terminal.

In an embodiment of 252 and at 253, the transaction video clip cache manager processes an API to provide the transaction data and the video clip to the interface.

In an embodiment, at 254, the transaction video clip cache manager provides the video clip to the management terminal as a link.

In an embodiment, at 255, the transaction video clip cache manager receives the first configured time and the second configured time as a configuration setting from an operator of the management terminal.

In an embodiment, at 256, the transaction video clip cache manager identifies the event as a security event having a timestamp that corresponds to a specific location within the video stored in the cache.

Figure 3:
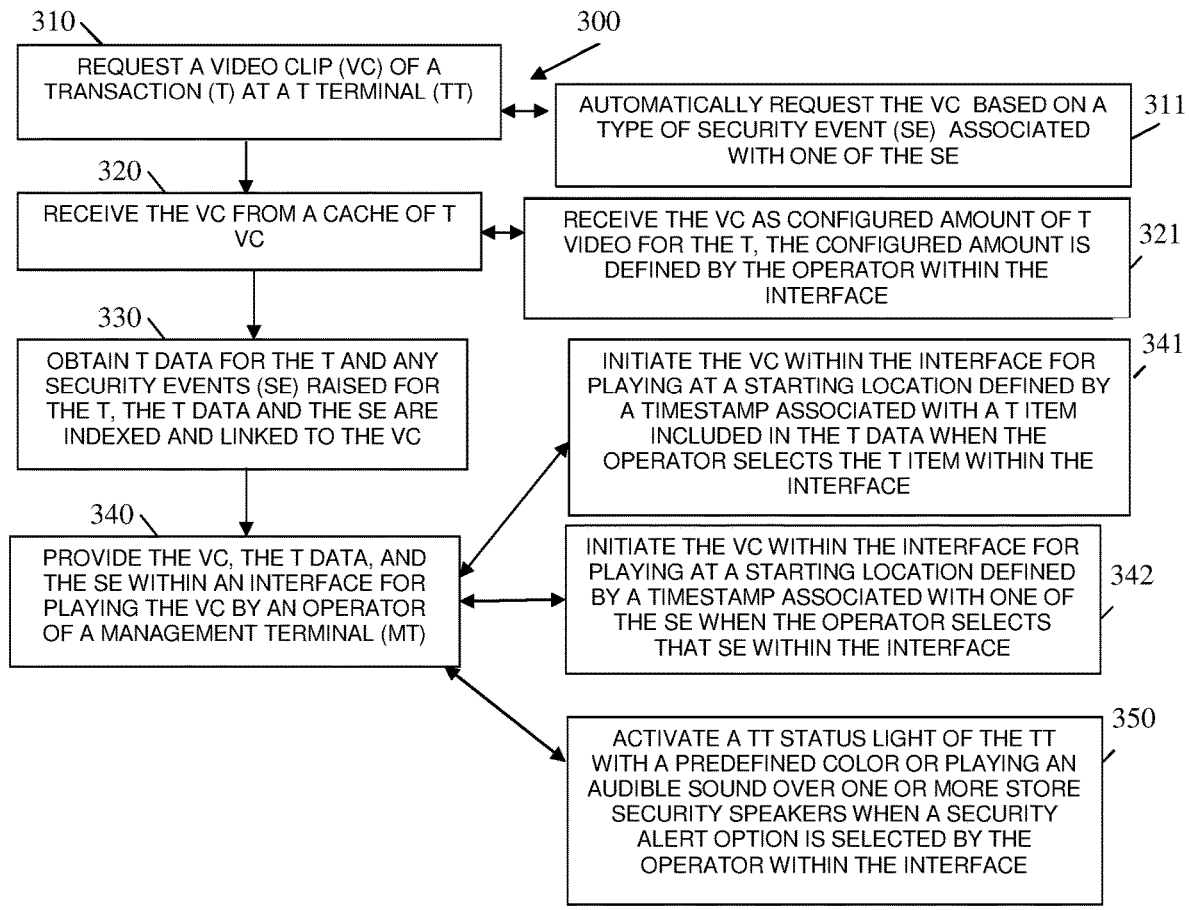
FIG. 3 is a diagram of another method for processing self-checkout security video review, according to an example embodiment.

FIG. 3 is a diagram of another method 300 for processing self-checkout security video review according to an example embodiment. The software module(s) that implements the method 300 is referred to as a "transaction video clip manager." The transaction video clip manager is implemented as executable instructions programmed and residing within memory and/or a non-transitory computer-readable (processor-readable) storage medium and executed by one or more processors of a management terminal. The processors that execute the transaction video clip manager are specifically configured and programmed to process the transaction video clip manager. The transaction video clip manager has access to one or more network connections during its processing. The network connections can be wired, wireless, or a combination of wired and wireless.

In an embodiment, the transaction video clip manager executes on management terminal 140. In an embodiment, management terminal 140 is a specially configured SST, a POS terminal, a laptop, a tablet, a desktop computer, and/or a phone.

In an embodiment, the transaction video clip manager is all of or some combination of the transaction manager 143 and/or event interface 144.

The transaction video clip manager interacts with event interface 156 and/or method 200 over a network connection (wired, wireless, or a combination of wired and wireless.

At 310, the transaction video clip manager requests a video clip of a transaction at a transaction terminal.

In an embodiment, at 311, the transaction video clip manager automatically requests the video clip based on a type of security event associated with one of the security events.

At 320, the transaction video clip manager receives the video clip from a cache of transaction video clips.

In an embodiment, at 321, the transaction video clip manager receives the video clip as configured amount of transaction video for the transaction, wherein the configured amount is defined by the operator within the interface.

At 330, the transaction video clip manager obtains transaction data for the transaction and any security events raised for the transaction, wherein the transaction data and the security events are indexed and linked to the video clip.

At 340, the transaction video clip manager provides the video clip, the transaction data, and the security events within an interface for playing the video clip by an operator of a management terminal.

In an embodiment, at 341, the transaction video clip manager initiates the video clip within the interface for playing at a starting location defined by a timestamp associated with a transaction item included in the transaction data when the operator selects the transaction item within the interface.

In an embodiment, at 342, the transaction video clip manager initiates the video clip within the interface for playing at a starting location defined by a timestamp associated with one of the security events when the operator selects that security event within the interface.

In an embodiment, at 343, the transaction video clip manager activates a transaction terminal status light of the transaction terminal with a predefined color or playing an audible sound over one or more store security speakers when a security alert option is selected by the operator within the interface.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

caching a video streamed from a camera and captured by the camera for a transaction area of a transaction terminal in a cache, wherein caching further includes receiving the video from the camera that is situated above or overhead of the transaction area, and wherein caching further includes offloading the video from the cache to storage on a server after a configured period of time after the transaction ends;

obtaining transaction data associated with a transaction occurring at the transaction terminal;

linking the transaction data to portions of the video residing in the cache;

receiving a request for a video clip of the transaction; and providing the video clip and the transaction data to a management terminal based on the request by taking a configured amount of the video from the cache that starts at a first configured time before an event and continues through a second configured time after the event.

2. The method of claim 1, wherein obtaining further includes obtaining one or more security events raised by a security system for the transaction.

3. The method of claim 2, wherein linking further includes linking the one or more security events to the portions or to other portions of the video residing in the cache.

4. A method, comprising:

caching a video streamed from a camera and captured by the camera for a transaction area of a transaction terminal in a cache;

obtaining transaction data associated with a transaction occurring at the transaction terminal;

linking the transaction data to portions of the video residing in the cache, wherein linking further includes indexing each item identified in the transaction data with the corresponding portion of the video based on timestamps associated with the corresponding item and the corresponding portion of the video;

receiving a request for a video clip of the transaction; and providing the video clip and the transaction data to a management terminal based on the request by taking a configured amount of the video from the cache that starts at a first configured time before an event and continues through a second configured time after the event.

5. The method of claim 4, wherein providing further includes providing the transaction data as a list of the items, each item of the list having metadata, and wherein the corresponding metadata associated with each item references a specific time location within the video clip.

6. The method of claim 1, wherein providing further includes providing the transaction data and the video clip to an interface of the management terminal.

7. The method of claim 6, wherein providing further includes processing an Application Programming Interface (API) to provide the transaction data and the video clip to the interface.

8. The method of claim 1, wherein providing further includes providing the video clip to the management terminal as a link.

9. A method, comprising:
caching a video streamed from a camera and captured by the camera for a transaction area of a transaction terminal in a cache;
obtaining transaction data associated with a transaction occurring at the transaction terminal;
linking the transaction data to portions of the video residing in the cache;
receiving a request for a video clip of the transaction; and
providing the video clip and the transaction data to a management terminal based on the request by taking a configured amount of the video from the cache that starts at a first configured time before an event and continues through a second configured time after the event, wherein providing further includes receiving the first configured time and the second configured time as a configuration setting from an operator of the management terminal.

10. A method, comprising:
caching a video streamed from a camera and captured by the camera for a transaction area of a transaction terminal in a cache;
obtaining transaction data associated with a transaction occurring at the transaction terminal;
linking the transaction data to portions of the video residing in the cache;
receiving a request for a video clip of the transaction; and
providing the video clip and the transaction data to a management terminal based on the request by taking a configured amount of the video from the cache that starts at a first configured time before an event and continues through a second configured time after the event, wherein providing further includes identifying the event as a security event having a timestamp that corresponds to a specific location within the video stored in the cache.

11. A method, comprising:
requesting a video clip of a transaction at a transaction terminal, wherein requesting further includes automatically requesting the video clip based on a type of security event associated with one of the security events;
receiving the video clip from a cache of transaction video clips;
obtaining transaction data for the transaction and any security events raised for the transaction, wherein the transaction data and the security events are indexed and linked to the video clip; and
providing the video clip, the transaction data, and the security events within an interface for playing the video clip by an operator of a management terminal.

12. A method, comprising:
requesting a video clip of a transaction at a transaction terminal, wherein receiving further includes receiving the video clip as configured amount of transaction video for the transaction, wherein the configured amount is defined by an operator within the interface;
receiving the video clip from a cache of transaction video clips;
obtaining transaction data for the transaction and any security events raised for the transaction, wherein the transaction data and the security events are indexed and linked to the video clip; and
providing the video clip, the transaction data, and the security events within an interface for playing the video clip by the operator of a management terminal.

13. The method of claim 11, wherein providing further includes initiating the video clip within the interface for playing at a starting location defined by a timestamp associated with a transaction item included in the transaction data when the operator selects the transaction item within the interface.

14. The method of claim 11, wherein providing further includes initiating the video clip within the interface for playing at a starting location defined by a timestamp associated with one of the security events when the operator selects that security event within the interface.

15. The method of claim 11 further comprising, activating a transaction terminal status light of the transaction terminal with a predefined color or playing an audible sound over one or more store security speakers when a security alert option is selected by the operator within the interface.

16. A system, comprising:
a camera;
a transaction terminal;
a management terminal comprising a terminal processor and a terminal non-transitory computer-readable storage medium having terminal executable instructions representing a terminal event interface;
a server comprising a server processor and a server non-transitory computer-readable storage medium having server executable instructions representing a server event interface;
the terminal event interface when executed by the terminal processor from the terminal non-transitory computer-readable storage medium causes the terminal processor to perform processing comprising:
providing the server event interface with an operator-defined period of time;
requesting a video clip from the server event interface for a video of a transaction area at the transaction terminal during a transaction being processed at the transaction terminal;
receiving the video clip from the server event interface;
receiving transaction data and any security events from the server event interface;
presenting the video clip, the transaction data, and the security events on a display of the management terminal; and
playing the video clip on the display based on selections made by the operator of the transaction data and the security events;
the server event interface when executed by the server processor from the server non-transitory computer-readable storage medium causes the server processor to perform processing comprising:
caching video provided by the camera in a cache;
receiving a request from the terminal event interface for the video clip;
deriving the video clip from the video in the cache by starting at a timestamped location within the video that precedes a security event timestamp or a transaction start timestamp by the operator-defined period of time and continues passed the security event timestamp or the transaction start timestamp by the operator-defined period of time;
indexing and linking the transaction data and the security events to portions of the video clip; and
providing the video clip, the transaction data, and the security events to the terminal event interface.

17. The system of claim 16, wherein the management terminal is a Self-Service Terminal (SST) configured as the management terminal, a Point-Of-Sale (POS) terminal configured as the management terminal, a teller terminal, a desktop computer, a laptop computer, a tablet computer, or a mobile phone.

\* \* \* \* \*